Oct. 15, 1935.　　C. A. CLARKE ET AL　　2,017,653
VELOCITY COMPARING SYSTEM FOR FILM DRIVING APPARATUS
Filed April 6, 1933
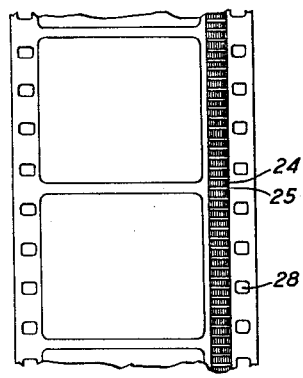
FIG. 2
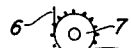
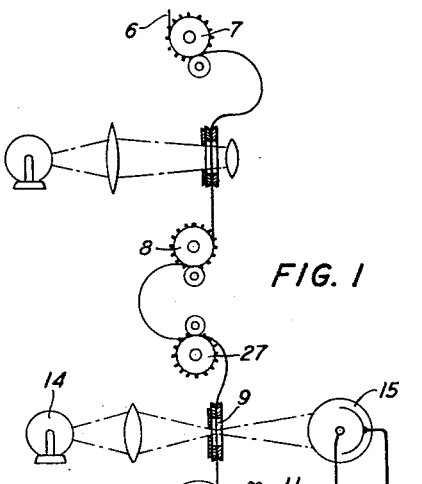
FIG. 1
FIG. 3
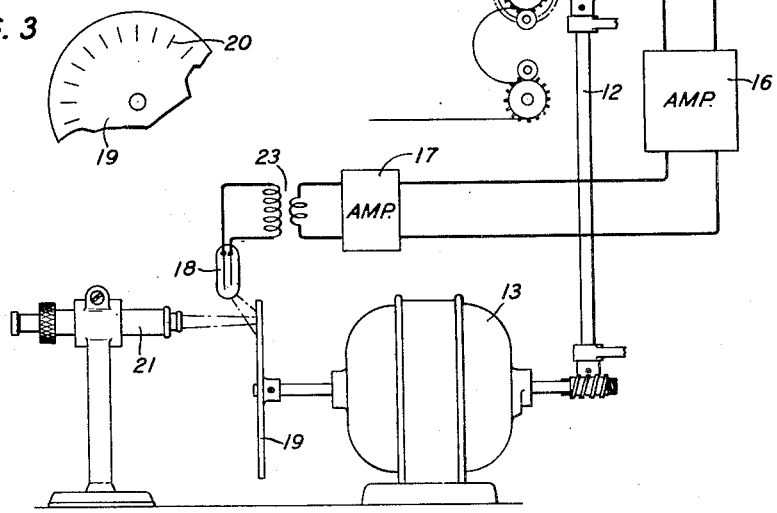
FIG. 4
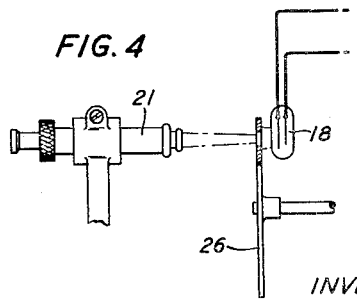
INVENTORS: C. A. CLARKE
L. A. ELMER
BY
G. H. Heydt
ATTORNEY

Patented Oct. 15, 1935

2,017,653

UNITED STATES PATENT OFFICE 2,017,653

VELOCITY COMPARING SYSTEM FOR FILM DRIVING APPARATUS

Carole A. Clarke, Chatham, and Lloyd A. Elmer, West Orange, N. J., assignors to Bell Telephone Laboratories, Incorporated, New York, N. Y., a corporation of New York Application April 6, 1933, Serial No. 664,784

3 Claims. (Cl. 88—14)

This invention relates to measuring methods and apparatus and has for an object the detection of variations in velocity between two movable members such as a driving member and a driven member.

In sound picture reproduction, for example, it is frequently of importance to determine the variations in velocity of the movement of the film past the sound gate relative to the speed of the driving motor. Former methods have been proposed for measuring the velocity variations between the motor and the sound sprocket but such a measurement does not give accurate results since it necessarily does not take into account such factors as distortion in film velocity due to eccentricity of the sound sprocket, variations in the pitch of the sprocket teeth, film perforation pitch errors, or distortion due to the climbing of the film on the teeth of the sprocket.

This invention as adapted to the determination of sound film velocity variations contemplates in one embodiment the use of a sound film having a constant frequency recorded thereon in the form of short clear striations separated by long opaque striations. Such a film may be threaded through a reproducing machine in the same manner as an ordinary sound film so that the usual photoelectric cell receives light impulses from the exciting lamp at a frequency determined by the velocity of the film movement. These light impulses produce electrical impulses of the same frequency in the output of the photoelectric cell which are amplified and impressed upon a suitable lamp such as a neon lamp which will emit light intermittently at a frequency determined by the film velocity. This intermittent light may be used to illuminate a stroboscope disc revolving on the motor shaft, the disc bearing engravings which pass a fixed point at the same average speed as the clear striations of the film past the light aperture. Thus, if the film speed is at all times the same as the motor speed, a line on the stroboscope disc will arrive at a certain position at the same time that the neon lamp flashes due to an impulse produced by the constant frequency film. However, if the film and the motor momentarily change their relative speeds the stroboscope line will appear to oscillate back and forth around a fixed point. The amplitude of this oscillation may be measured by a filar micrometer microscope and this measurement converted into velocity variations of the film. The frequency of the observed oscillations may be determined in any suitable manner such as by counting the number of oscillations in a given time interval since important velocity variations are encountered in practice which are of the order of 6 cycles per second or less. Referring to the drawing, Fig. 1 discloses one form of this invention as applied to the detection of film speed variations in a sound picture reproducing machine;

Fig. 2 illustrates a type of film which may be employed in making the desired film speed test;

Fig. 3 shows a detail of the stroboscopic disc employed in Fig. 1; and

Fig. 4 discloses an alternative type of stroboscopic disc capable of use in the arrangement of Fig. 1.

Fig. 1 discloses how this invention may be utilized to determine if there are variations in velocity of a motion picture film relative to the driving motor of a sound picture projection equipment. The projection equipment to be tested for this possible variation may be of various types and for the purpose of illustrating this invention it may be assumed that the equipment is of the general type disclosed in British Patent 322,233. The drawing does not disclose the complete projection apparatus but only such parts as are essential to an understanding of the present invention.

In the projection equipment under test the film 6 is withdrawn from a supply reel by a driven sprocket 7 and an intermittently driven sprocket 8 serves to draw the film through a picture gate (not shown). The film then passes over a hold back sprocket 27 to the sound gate 9, being driven at this time by the usual constant speed sprocket 10 after which the film passes ultimately to a suitable take-up reel. The sound record on the film is traversed by a light beam from source 14 and the resulting light variations are translated into electrical variations by a photoelectric cell 15. The output of the cell 15 is connected to suitable amplifying equipment for the purpose of amplifying the photoelectric cell output to a desired level. The sprocket 10 is suitably coupled to a gear 11 on a shaft 12 driven by a motor 13.

As is well understood in the art the motor 13 and the coupling to the sprocket 10 should be such that the sprocket 10 is rotated at a constant speed since variations in the velocity of the film through the sound gate will distort the reproduction of the sound record. Even when the motor speed is regulated to be kept constant within satisfactory limits there are other factors involved which may result in film speed variations such as eccentricity in the sound sprocket 10, variations in the pitch of the sprocket teeth, film perforation pitch errors, or a tendency of the film to climb on the teeth of the sound sprocket. These various possible causes for film speed variations will not necessarily be in phase with each other but the manufacturer of sound picture projection equipment is not only interested in their individual magnitudes but also in their cumulative effect on the film speed. The present invention provides a ready means for determining variations in film speed with respect to motor speed regardless of the cause of the variations.

In accordance with this invention a special test film 6 is threaded through the machine in the same manner as the ordinary sound film. This film may, for example, comprise alternate short, clear striations and long opaque striations uniformly spaced along the film. Such a record track is disclosed, for example, in Fig. 2 where the short, clear striations 25 are separated by long, opaque striations 24. The distance between any two adjacent clear striations on the film should bear a definite relation to the motor speed as will be explained later. The passage of such a film through the sound gate will cause the photoelectric cell to receive from the exciting lamp light impulses which will cause in the photoelectric cell output, short impulses of current separated by longer periods of no current. These impulses after being amplified by the usual amplifiers of the projection equipment such as amplifiers 16 and 17 are impressed through a step-up transformer 23 upon a gas-filled tube such as a neon lamp 18 of a type that the current impulses will produce flashes of light between the lamp electrodes separated by periods of darkness. The lamp 18 is placed so that the intermittent light therefrom is directed to a disc 19 mounted on and revolving with the motor shaft. This disc bears near its outer surface uniformly spaced radial engravings 20 as shown in Fig. 3. If the speed of film 6 at the sound gate is at all times the same as the motor speed, a line on the stroboscopic disc 20 will arrive at a certain position at the same time that the neon lamp flashes due to an impulse controlled by the constant frequency film. However, if the film and motor momentarily change their relative speeds the stroboscope line or engraving will appear to oscillate back and forth about a fixed position. This oscillation may be measured by a filar micrometer microsope 21 and the measurement so taken may be readily converted into velocity variations of the film, assuming the radius of disc 20, the speed of motor 13, and the velocity of the film are known. The setting of the cross hairs in the microscope will give the amplitude of the velocity variations while the frequency of variations may be counted by an observer using a stop watch since it has been found that for most projection equipment the principal frequencies due to film speed variations are less than 6 cycles per second.

The equipment just described, therefore, enables one to determine the magnitude and frequency of film speed variations with respect to the motor speed and the observations made in the above manner will enable one to determine if any particular sound picture projection equipment is operating satisfactorily to give constant speed to the film at the sound gate or alternatively may be used as a basis for determining what alterations in the equipment improve the constancy of film travel at the sound gate.

Fig. 4 discloses an alternative arrangement in which the light flashes in the neon lamp 18 are directly viewed in the microscope 21 through small radial slits or apertures in the disc 26 mounted on the motor shaft in the same manner as disc 19 in Fig. 1. Such a disc may be employed in testing the sound picture projection equipment in the same manner as that described above for Fig. 1.

The number of clear striations per unit length in the test film 6 should depend upon the motor speed and film velocity. Assume in a specific case a one to one ratio between motor speed and film velocity and assume that the motor rotates at a constant speed of 20 revolutions per second. We may assume a stroboscopic disc 20 with 24 equally spaced engravings or slots. This would therefore mean that the markings on the disc would pass the field of the microscope at the rate of 480 markings per second. A standard size film for the above motor speed would have 96 of its perforations, 28 passing the sound gate per second. Therefore, we should have 5 clear striations on the film in a length equal to the distance between two adjacent film perforations so as to cause the lamp 18 to flash 480 times per second to give the same flashing frequency as the disc marking passage frequency if the film is traveling at constant speed. This high number of flashes per second will give a quite satisfactory stroboscope pattern.

It is to be understood that the patricular embodiment described above for illustrative purposes may be variously modified without departure from the spirit and scope of the invention as defined in the appended claims.

What is claimed is:

1. Apparatus for determining the variations in instantaneous relative velocity between a driving source and a film driven thereby through a positive connecting means in a film driving apparatus, said means comprising a film having a constant frequency record thereon and adapted to be driven from said driving source at an average velocity equal to the average velocity of said driving source, means for translating said record into electrical impulses, a lamp lighted by said electrical impulses, and a stroboscopic member mounted on said driving source to be driven thereby and positioned in the path of light from said lamp.

2. In a film driving apparatus, a film having a constant frequency record thereon, a sprocket for driving said film, a source of power, a stroboscopic member mounted upon said source of power to be driven thereby, means for connecting said source of power and said sprocket to produce movement of said film at the same average velocity as said source of power, means for translating the record on said film into light impulses, and means for projecting said light impulses to said stroboscopic member whereby the magnitude and frequency of variations in instantaneous relative velocity between the driven film and said source of power may be determined.

3. In a film driving mechanism, means for determining the magnitude and frequency of variations in instantaneous velocity of a film driven by said mechanism, comprising a driving means having a stroboscopic member mounted thereon to be directly driven thereby, a film having a constant frequency record thereon, a sprocket for driving said film, said sprocket having a connection to said driving means to produce movement of said film at an average velocity equal to the average velocity of said driving means, means for translating the record on said film into electrical impulses and for converting said electrical impulses into light impulses, and means for projecting said light impulses upon said stroboscopic member mounted upon said driving means.

CAROLE A. CLARKE.
LLOYD A. ELMER.